United States Patent Office.

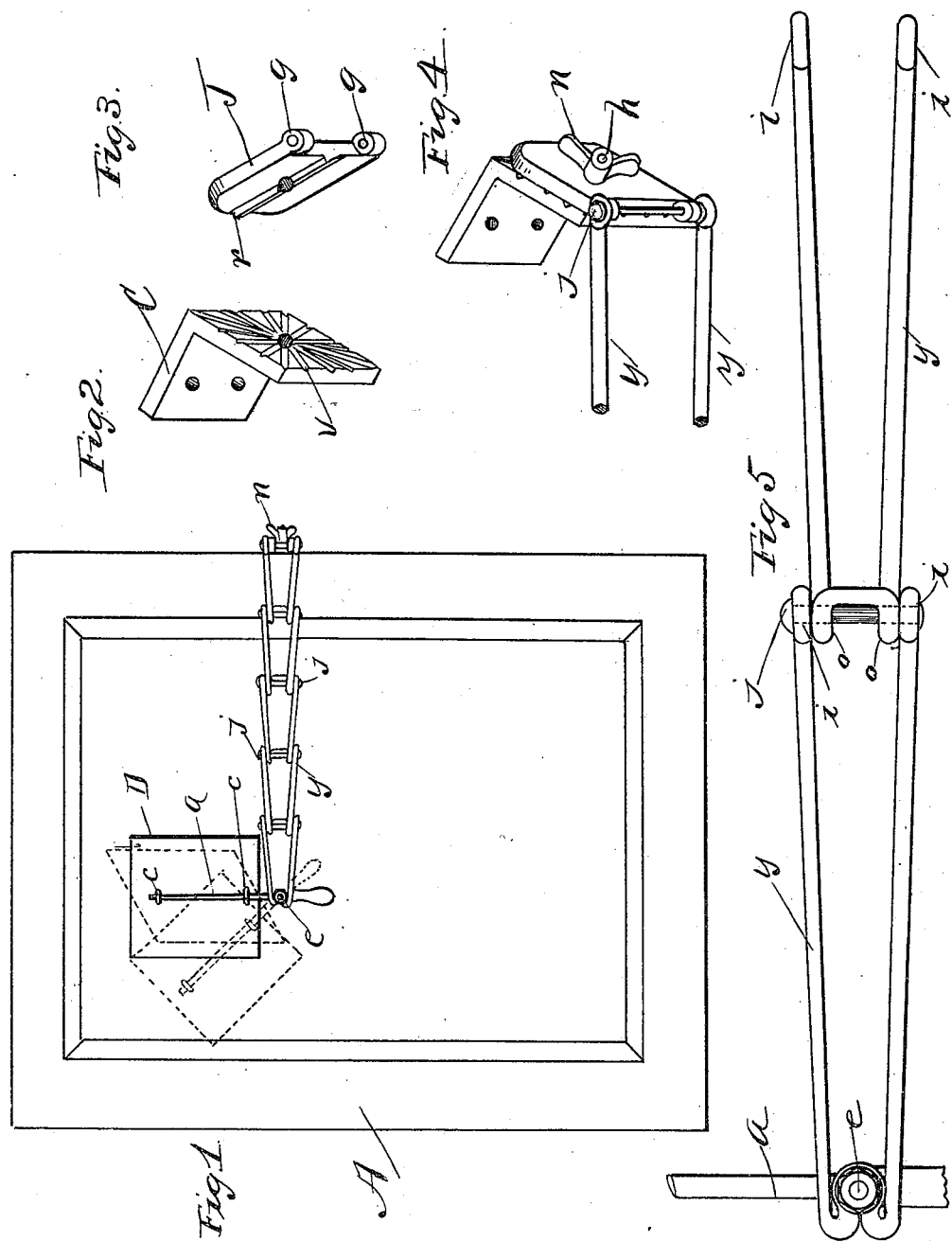

DANIEL C. KENYON, OF WYOMING, RHODE ISLAND.

LADY'S TOILET-MIRROR.

SPECIFICATION forming part of Letters Patent No. 623,790, dated April 25, 1899.

Application filed April 11, 1898. Serial No. 677,157. (No model.)

*To all whom it may concern:*

Be it known that I, DANIEL C. KENYON, of Wyoming, in the county of Washington and State of Rhode Island, have invented certain new and useful Improvements in Ladies' Toilet-Mirrors; and I do hereby declare that the following is a full, clear, and exact description thereof, reference being had to the accompanying drawings, and to the letters of reference marked thereon, which form a part of this specification.

This invention relates to the manner of holding a small auxiliary mirror used mostly by ladies in connection with the usual large mirror to enable them to see the back portion of the head or dress.

It is fully explained and illustrated in this specification and the accompanying drawings.

Figure 1 shows in elevation one of the smaller mirrors mounted on the improved holder attached to the frame of a large mirror. Fig. 2 shows a portion of the device used to attach the holder to the frame of the large mirror. Fig. 3 is the other part of the device, a portion of which is shown in Fig. 2. Fig. 4 represents the two parts shown in Figs. 2 and 3 put together as they are when in use. Fig. 5 shows the form of the links of the holder and the way they are connected together.

The object of this invention is to produce a holding device for a small mirror in connection with a large mirror that shall be capable of setting the mirror in any desirable position and that shall be light and neat and not expensive to make.

In Fig. 1, A represents the ordinary large mirror usually attached to the side of the room or held in supports on the top of a bureau. D is a smaller mirror held on a spindle $a$ by means of screw-eyes $c\ c$, that allow the mirror to turn completely around horizontally. This spindle $a$ is flattened a little way up from its lower end to receive a bolt $e$, that passes through an eye in the end of the last link of the holder by which it is secured to that link and allowed to make a complete turn in a vertical plane on the bolt.

In Fig. 2 is seen the part of the device C that is made fast to the large mirror-frame. It consists of a knee of metal having two holes in one of its flanges for screws by which it is fastened, preferably, to the back of the mirror-frame, though it may be put on the edge, if preferred. The other flange of the knee C has grooves $v\ v$ made in its face radiating from a hole made in the center of the flange to receive a bolt $h$, by which the other part J of the device seen in Fig. 3 is made fast to it. That part J consists of a flat plate having two ears $g\ g$ on one side, with holes in them to receive a pin $j$, that connects the plate to the first link of the holder, which has eyes at its end that enter between the ears $g\ g$, Fig. 1, so that the pin $j$ will pass through them. This plate J has a hole in its center through which the bolt $h$ passes, and a thumb-nut $n$ on the end presses the two parts together, a ridge $r$ on the face of part J entering one of the grooves $v$ on the part C to prevent the plate from moving on the knee C when the thumb-nut is screwed up. The form of the links $y\ y$ are shown in Fig. 5. They are made, preferably, of wire bent into a loop, with two eyes $i\ i$ at one end, and the other end is formed into two eyes $o\ o$, which pass in between two eyes $i\ i$ of the next link, and a pin $j$ is put through the four eyes to connect two links together. The end link, near the mirror D, has one end made into a flat loop, through which the bolt $e$ passes, as before mentioned. To put the holder and mirror D up in position for use, the knee C is secured to the frame of mirror A, preferably on the back, though it may be put on the edge or on some support adjacent to the mirror by means of screws through the holes in the knee. Then by loosening the thumb-nut $n$ the plate J can be turned so as to throw the arm of the holder up or down, and by turning the mirror D on the spindle or on the spindle in the bolt $e$, or by a combination of those motions, the mirror can be placed in any desired position with regard to the larger mirror.

The links of the holder have been described as being made of wire; but they may be made of metal in other forms or of any other suitable material.

Having thus described my improvements, I claim as my invention and desire to secure by Letters Patent—

1. In a toilet-mirror and holder, an adjustable clamp secured to a large mirror or some adjacent support, and provided with ears, combined with a flexible support consisting of a series of links, each one of which is made tapering, and which have their smaller ends inserted between the larger end of the next adjacent link, bolts $j$, which are passed through the links, and a smaller mirror which is mounted upon the free end of the support, substantially as described.

2. A support for a mirror consisting of a suitable number of tapering links which are provided with eyes $i$, at one end and with the bent portions $o$, at the other, the end of one link fitting in the end of the next adjacent one, combined with the bolts $j$, which pass through the eyes $i$, and the bent portions $o$, a clamp to which the inner end of the support is fastened, and a spindle adjustably secured to the other end of the support, substantially as described.

In testimony whereof I have hereunto set my hand this 9th day of April, A. D. 1898.

DANIEL C. KENYON.

In presence of—
  BENJ. ARNOLD,
  HOWARD E. BARLOW.